March 25, 1958  E. A. DE PEU  2,827,708
PIPE CUTTING INDICATOR
Filed Oct. 18, 1955  4 Sheets-Sheet 1
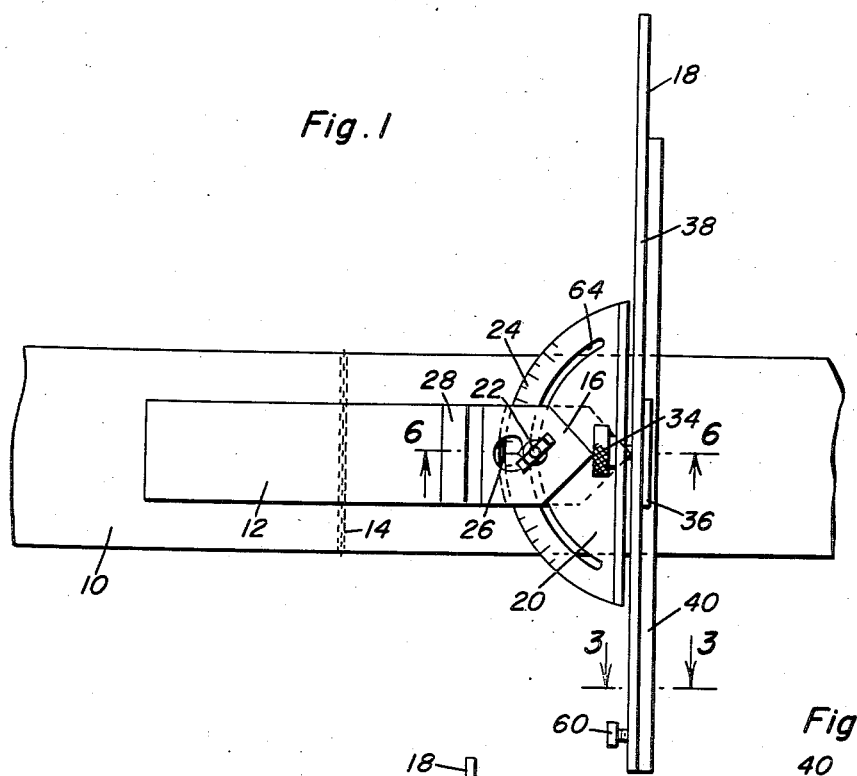
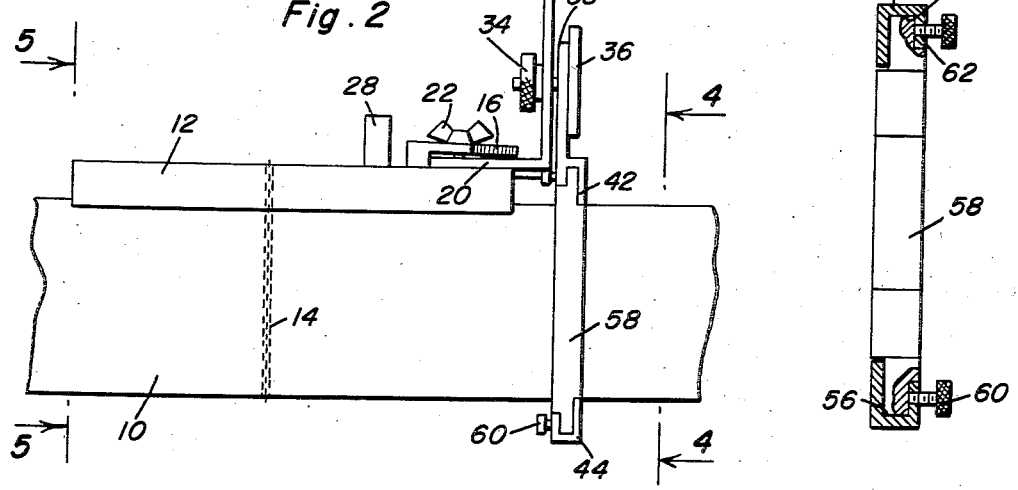
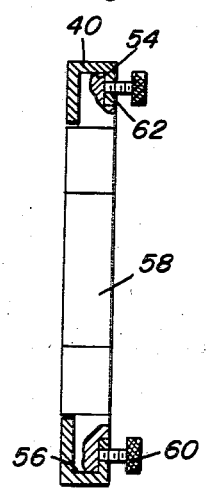
Evans A. De Peu
INVENTOR.
BY March 25, 1958     E. A. DE PEU     2,827,708
PIPE CUTTING INDICATOR
Filed Oct. 18, 1955     4 Sheets—Sheet 2
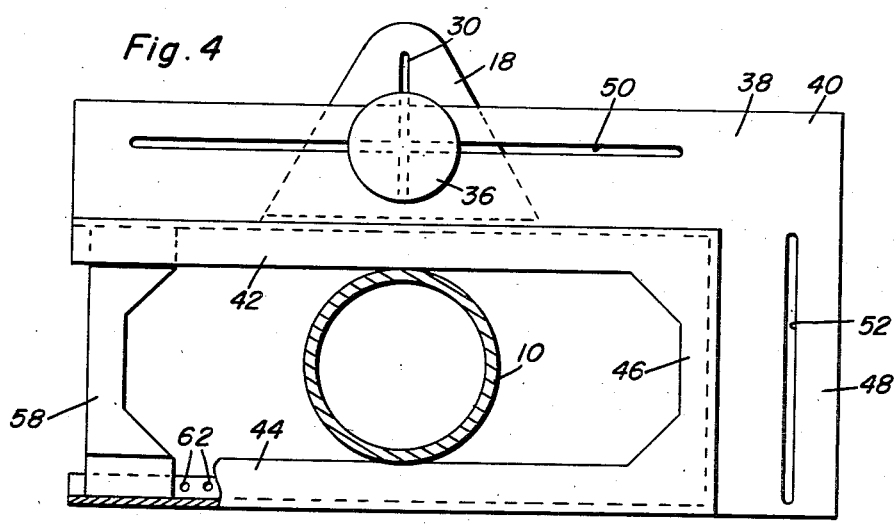
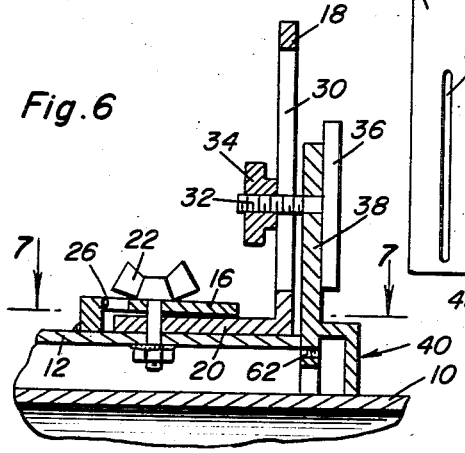
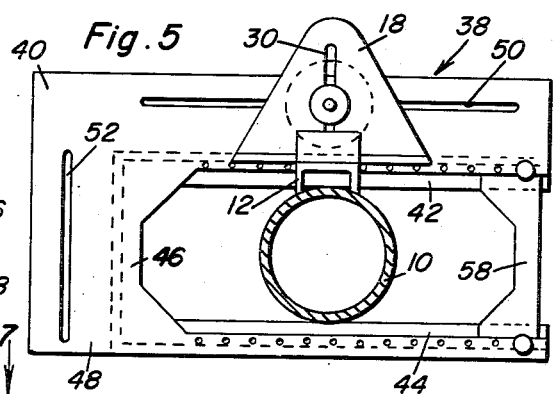
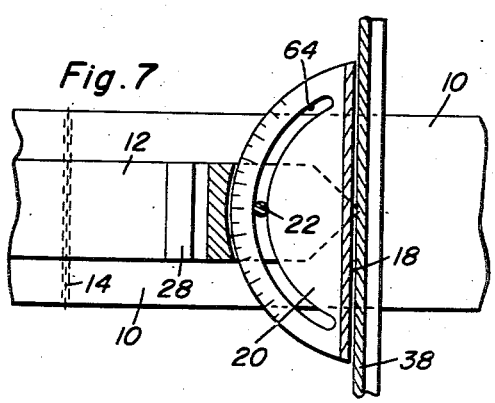
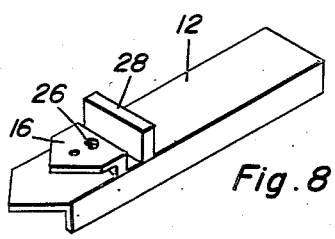
Evans A. De Peu
INVENTOR.

March 25, 1958   E. A. DE PEU   2,827,708
PIPE CUTTING INDICATOR
Filed Oct. 18, 1955   4 Sheets-Sheet 3
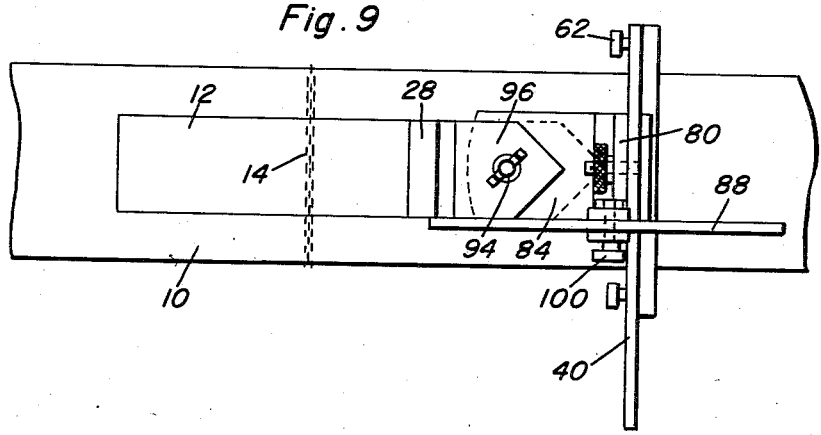
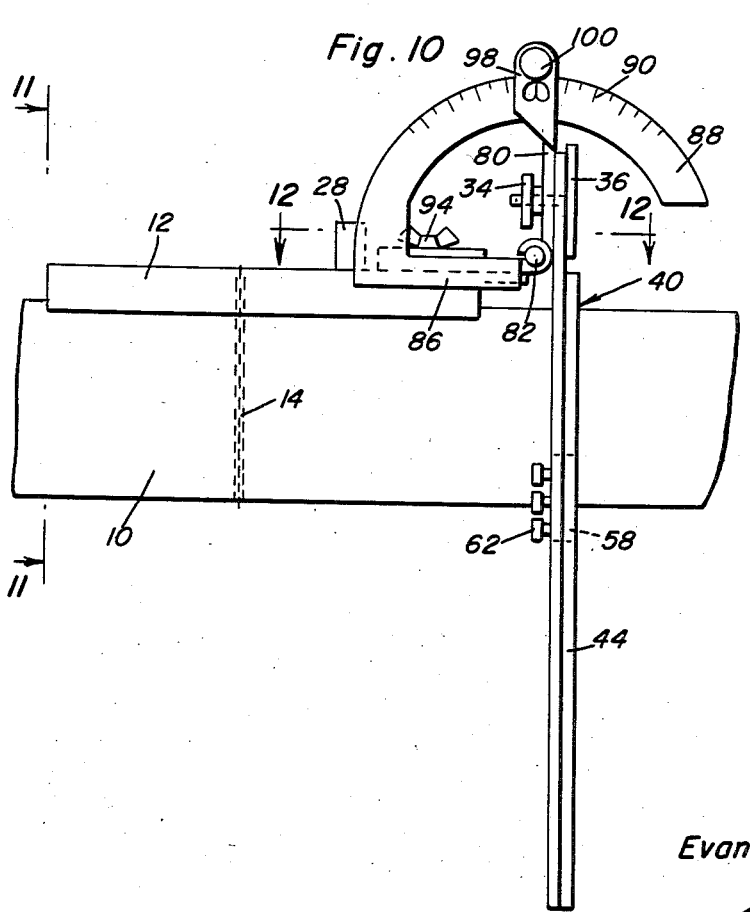
Evans A. De Peu
INVENTOR.

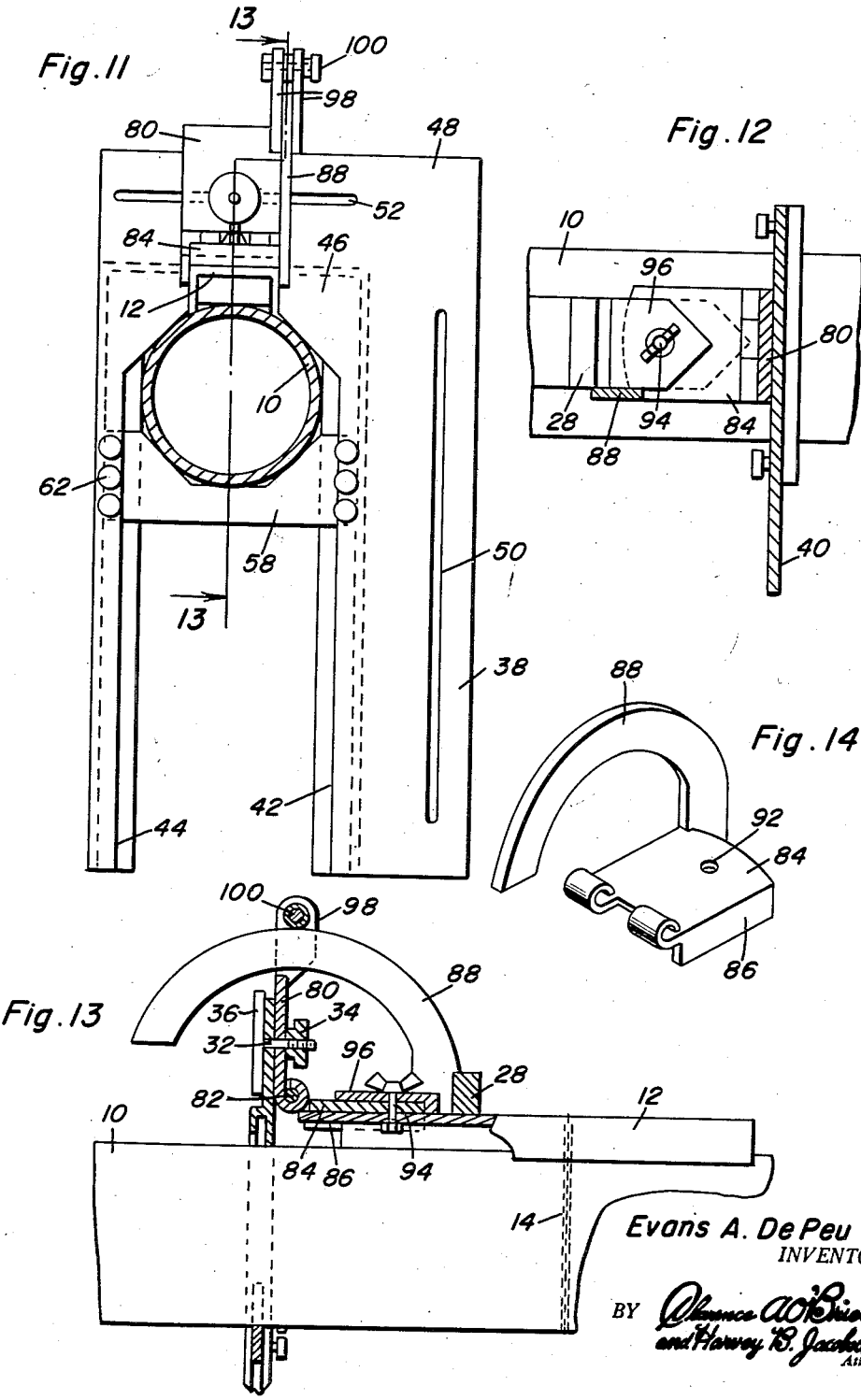

United States Patent Office 2,827,708
Patented Mar. 25, 1958

2,827,708
PIPE CUTTING INDICATOR
Evans A. DePeu, San Francisco, Calif.

Application October 18, 1955, Serial No. 541,114

2 Claims. (Cl. 33—174)

This invention comprises novel and useful improvements in a pipe cutting indicator and more specifically relates to subject matter which is similar to but constitutes improvements over my prior co-epnding application, Serial No. 508,009, filed May 13, 1955, for a Pipe Cutting Indicator.

More specifically, this invention relates to a gauge for the angular scribing and cutting of pipes, and has as its primary object to provide a gauging device which may be readily applied to pipes of different sizes to facilitate the scribing or cutting of such pipes upon various predetermined planes which are angularly inclined with respect to the longitudinal axis of the pipe.

Another important object of this invention resides in the provision of a gauge which is capable of being readily applied to pipes of different sizes and which will facilitate the scribing or cutting of such pipes upon various desired angles.

Another object of the invention is to provide a pipe cutting indicator as set forth in the foregoing objects which shall include a protractor to enable the device to be set at predetermined angles and which protractor shall cooperate with the base portion and engage a portion of the device in an improved manner.

Yet another object of the invention resides in the provision of a gauge in accordance with the preceding objects whereby a straight edge may be carried by the angle adjusting portion of the device, adjustably, in an improved manner.

Yet another additional object of the invention comprehends the provision of a gauging device of the character set forth in the preceding objects and which shall include a straight edge capable of ready adjustment for positioning the same in various predetermined angular planes relative to the longitudinal axis of the pipe to be gauged or scribed; and whereby various sections of the internal periphery of the straight edge frame may be placed in contact with circumferentially extending portions of the pipe whereby the latter may be scribed or cut upon a plane disposed at the same predetermined angle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view showing a portion of a pipe together with the pipe cutting indicator of this invention applied thereto;

Figure 2 is a side elevational view of the arrangement of Figure 1;

Figure 3 is a detailed view taken in vertical section substantially upon the plane indicated by the section line 3—3 of Figure 1 and upon a somewhat enlarged scale, parts being broken away and shown in section;

Figure 4 is a detailed view taken upon an enlarged scale in vertical transverse section substantially upon the plane indicated by the section line 4—4 of Figure 2 and looking towards the frame of the gauge encircling the pipe, a part of the gauge being broken away and shown in section;

Figure 5 is a further detailed view taken upon an enlarged scale substantially upon the plane indicated by the section line 5—5 of Figure 2 and taken from the other side of the gauge;

Figure 6 is a vertical longitudinal sectional view taken upon an enlarged scale substantially upon the plane indicated by the section line 6—6 of Figure 1 and showing the manner in which the protractor of the gauge is mounted upon the base thereof;

Figure 7 is a horizontal sectional view taken substantially upon the plane indicated by the section line 7—7 of Figure 6 and showing further details of the protractor mounting;

Figure 8 is a perspective view of the base member of the gauge;

Figure 9 is a view similar to Figure 1 but of a modified construction;

Figure 10 is a side elevational view of the construction of Figure 9;

Figure 11 is a vertical transverse sectional view taken substantially upon the plane indicated by section line 11—11 of Figure 10 and upon an enlarged scale;

Figure 12 is a detailed view taken in horizontal section substantially upon the plane indicated by the section line 12—12 of Figure 10;

Figure 13 is a vertical sectional detailed view taken substantially upon the plane indicated by the section line 13—13 of Figure 11; and, Figure 14 is a perspective view of an element of the embodiment of Figure 9.

Reference is made first to the embodiment of Figures 1–8, wherein it will be observed that the numeral 10 designates a portion of a pipe which it is desired to cut or to scribe or mark upon a plane positioned at a predetermined selected angle relative to the longitudinal axis of the pipe. The gauge or indicator forming the subject of the present invention consists of a base 12 which may conveniently include a flat top surface from which depend longitudinally extending ribs or the like whereby the base may be supported upon and rest upon the pipe 10 in longitudinal alignment therewith, a chain or the like 14 being provided to rigidly clamp the base to the pipe at a predetermined portion thereon, it being understood that the actual construction of the clamp and fastening means are immaterial for the purpose of the present invention.

Secured to the base 12 and overlying what may be termed the forward end of the same is a plate 16. The standard indicated generally by the numeral 18 rises perpendicularly above the base, being positioned beyond the end thereof and having a flat perpendicular plate 20 which rests upon the base and is received beneath the plate 16. The thumb screw 22 comprises a pivot pin for the standard, extending through the plate 16, through the standard plate 20 and through the base 12, as will be best apparent from Figure 6.

As in my prior co-pending application, the plate 20 is provided with indicia thereby constituting the protractor 24, these indicia being visible as through an opening 26 in the plate 16.

Rising from the base is a suitable level 28 of any conventional design.

As will be best apparent from Figures 4, 5 and 6, the standard 18 is provided with a vertical slot 30 therein in which is slidably received a fastener consisting of a bolt 32 having a thumb nut 34 for tightening the same, the bolt including an enlarged head 36 as shown best in Figures 4 and 6. By means of this fastener, the upwardly projecting transversely extending flange 38 of the frame indicated generally by the numeral 40 and constituting a straight edge is mounted upon the standard.

Referring now especially to Figures 3–6, it will be seen that the frame 40, consists of a laterally thickened U- shaped portion comprising parallel upper and lower arms 42 and 44 which are adapted to loosely embrace the pipe 10 and which are closed at one end by an end block 46 integral therewith. The upper transversely extending flange 38 has a vertical continuation constituting a flange 48 at the closed end of the U-shaped frame portion as will be apparent from Figure 4. A transversely or horizontally extending slot 50 is formed in the flange 38, while a vertically extending slot 52 is disposed in the flange 48. The fastener 32 being slidably received in the slot 50 permits the frame to be adjusted transversely of the fastener and standard and of the pipe, while vertical adjustment of the frame is permitted by vertical movement of the frame and fastener by means of the vertical slot 30.

As will be best apparent from Figure 3, the thickened U-shaped portion of the frame has its upper and lower arms provided with guide channels 54 and 56, respectively, and a closure block 58 is slidably received and retained in these channels for movement towards and from the stationary end block 46. Locking screws 60 engage in threaded bores 62 and the upper and lower arms serve to lock the closure block in adjusted position relative to the end block 46.

Referring again to Figures 1 and 7, it will be seen that the standard mounting plate 20 is provided with an arcuate slot through which the wing bolt 22 extends, and by means of which the standard and the frame carried thereby may be pivotally adjusted upon the base.

It will now be apparent that the straight edge defined by the opening contained between the upper and lower arms 42 and 44 and the blocks 46 and 58 may be raised or lowered and adjusted transversely or horizontally with respect to a pipe, and may also be independently swung horizontally into planes which are angularly variable with respect to the vertical planes with the longitudinal axis of the pipe. Thus, any portion of the internal rim of the frame 40 may be placed against a portion of the pipe for positioning a tool for cutting or scribing the same.

Reference is now directed to Figures 9–14 disclosing a modified construction.

In this form, there is provided the same base 12 as previously described, which is secured to a pipe 10 by the chain or other fastening and clamping means 14. However, a standard indicated by the numeral 80 is hinged or pivotally attached as at 82 at its lower end to a support plate 84, which latter has depending lugs 86 embracing the sides of the base 12 for fixedly positioning the support plate thereon. Rising from one side of the support plate is an arcuate member 88 constituting a guide, the same being provided with indicia 90 upon one face thereof to constitute a protractor as set forth hereinafter.

The support plate 84 is provided with an aperture 92 for the reception of a wing bolt and nut 94 by means of which the support plate is rigidly clamped to the end portion of the base 12. As in the preceding embodiment, a plate 96 carried by the base 12 overlies the end portion of the same and the support plate 84 is received between the base and this plate 96. Also as in the preceding embodiment a conventional level 28 is secured to the base.

The same construction of frame described in the preceding embodiment is employed. However, in this modification the frame is mounted upon the standard by means of the slot 52 rather than by the slot 50 as in the preceding form. Since the frame construction is identical with that previously described, the same reference numerals have been applied to the embodiment of Figures 9–14 and a further description of the same is unnecessary. However, it will be noted that in this arrangement the frame is mounted with its legs disposed in parallel vertical relation and whereby the end block 46 is disposed horizontally above the pipe 10 and the adjustable closure block 58 is disposed below this pipe.

In this arrangement it will be seen that the frame may be tilted in vertical planes which are transverse to the longitudinal axis of the pipe at adjustable angles relative to the perpendicular transverse vertical plane. At the same time, the fastener assembly 34 and 36 permits lateral adjustment of the frame but prevents vertical adjustment thereof.

As shown best in Figures 10 and 13, the upper end of the standard 80 is provided with a pair of ears 98 which slidably embrace the guide 88 and which are provided with a clamping bolt 100 extending therethrough whereby the standard may be locked to the protractor in a selected position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gauge for the angular scribing and cutting of pipes comprising an elongated base adapted to rest upon a pipe in longitudinal alignment therewith, means for fixedly clamping said base upon said pipe, a standard consisting of a flat plate, a support plate to which said standard is hinged for vertical tilting, means securing said support plate to said base, a rigid frame adapted to loosely encircle said pipe and provide a straight edge for adjustably positioning a tool in planes at predetermined vertical angles to a vertical plane perpendicular to the longitudinal axis of the pipe, means mounting said frame on said standard for transversely slidable adjustment on said standard, an arcuate guide secured to said base and rising vertically therefrom, means on said standard and projecting therefrom and slidably guided upon and embracing said guide, said guide having indicia and comprising a vertical protractor disposed at one side of said base.

2. A gauge for the angular scribing and cutting of pipes comprising an elongated base adapted to rest upon a pipe in longitudinal alignment therewith, means for fixedly clamping said base upon said pipe, a standard consisting of a flat plate, a support plate to which said standard is hinged for vertical tilting, means securing said support plate to said base, a rigid frame adapted to loosely encircle said pipe and provide a straight edge for adjustably positioning a tool in planes at predetermined vertical angles to a vertical plane perpendicular to the longitudinal axis of the pipe, means mounting said frame on said standard for transversely slidable adjustment on said standard, a vertically extending flat strip comprising an arcuate guide secured to said base at one side thereof, means comprising upwardly projecting parallel lugs on said standard slidably guided upon and embracing said guide, a clamping means for said lugs, said guide being carried by said support plate.

References Cited in the file of this patent

UNITED STATES PATENTS

| | | |
|---|---|---|
| 279,336 | Clark | June 12, 1883 |
| 1,516,288 | Godfrey | Nov. 18, 1924 |
| 1,692,925 | Brown | Nov. 27, 1928 |
| 1,698,154 | Day | Jan. 8, 1929 |
| 1,778,981 | McLaughlin | Oct. 21, 1930 |
| 2,095,479 | Ridgeway | Oct. 2, 1937 |
| 2,326,447 | Enderson | Aug. 10, 1943 |
| 2,334,422 | Lehnus | Nov. 16, 1943 |
| 2,607,126 | Sekki | Aug. 19, 1952 |
| 2,611,183 | Thrower | Sept. 23, 1952 |
| 2,677,181 | Sary | May 4, 1954 |